Dec. 30, 1952     I. O. BARLOW ET AL     2,623,517
SURGICAL ABDOMINAL RETRACTOR
Filed June 29, 1950
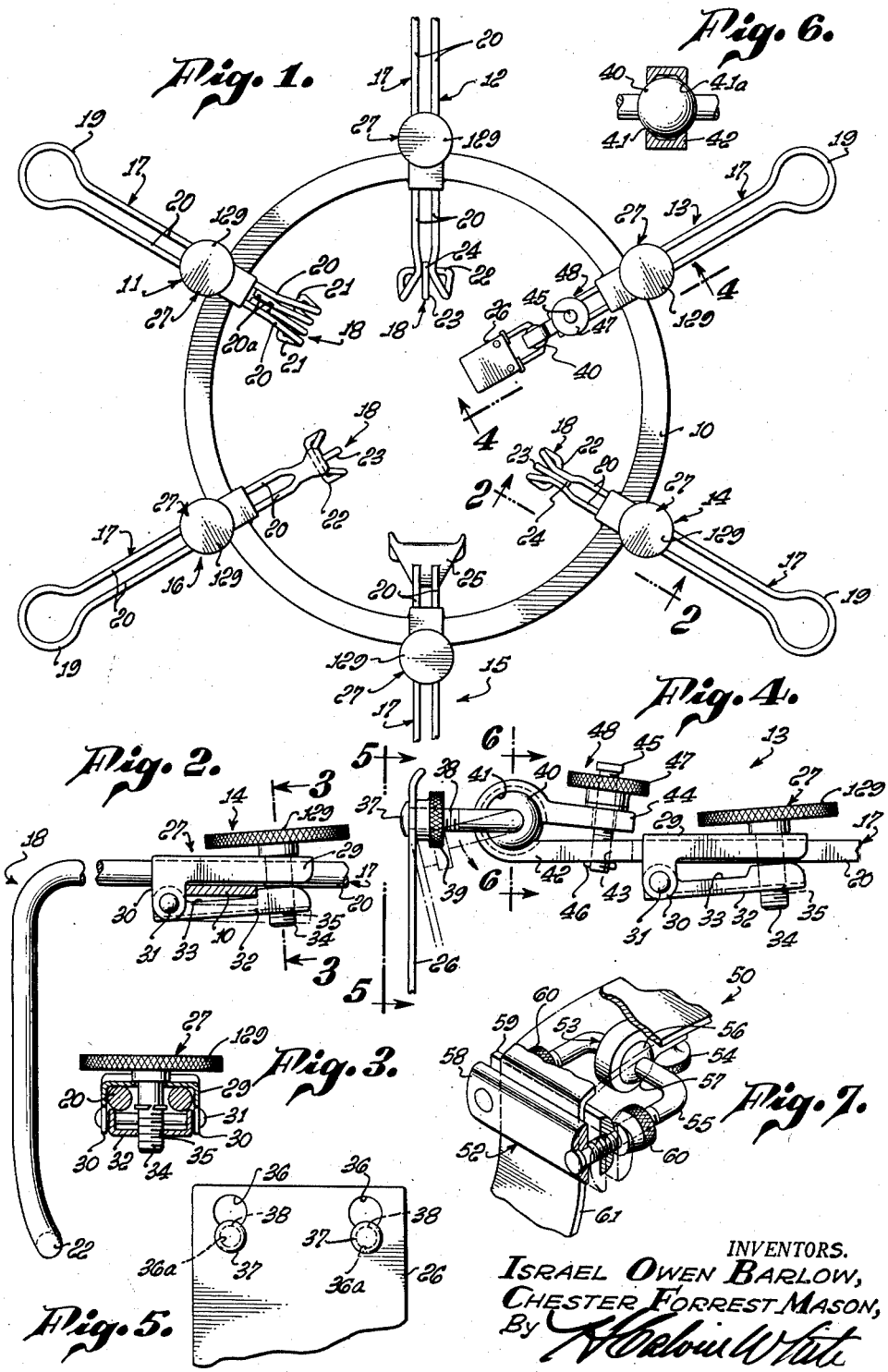
INVENTORS.
ISRAEL OWEN BARLOW,
CHESTER FORREST MASON,
By
ATTORNEY.

Patented Dec. 30, 1952

2,623,517

UNITED STATES PATENT OFFICE 2,623,517

SURGICAL ABDOMINAL RETRACTOR

Israel Owen Barlow, Long Beach, and Chester Forrest Mason, Fullerton, Calif.

Application June 29, 1950, Serial No. 171,162

12 Claims. (Cl. 128—20)

This invention has to do with improvements in surgical retractor assemblies of the general type adapted to be placed most usually about the area of an abdominal surgery, comprising an arrangement of individual retractor or holding units independently manipulable and adjustable to maintain the various organs away from a particular locus of the surgery. More specifically, retractor assemblies of this type comprise an endless frame, typically of circular form, carrying a number of retractor units the outer or handle portions of which extend across and into the open center of the frame wherein the retractor units carry angular head or blade portions extending axially of the frame and having any of various shapes and configurations best adapting them to the retraction of different organs in the various locations.

Our general objects are directed to improvements both in the retractor units and the assembly as a whole affording, as to the units, a superior instrument from standpoints of simplicity and economy of manufacture, its adaptability to easy and complete sterilization; and as to the assembly, novel associations between the retractor units and the frame, as well as between the handle and blade portions of the units, permitting greater facility of adjustment and more secure retention of the parts in their adjusted positions, than have been possible with any prior surgical retractors of which we are aware.

Considering first the retractor units, the invention contemplates their formation of substantially rigid wire doubled upon itself so that the handle has an open one-piece formation of parallel extents, with the wire looped at its outer extremity. As will appear, the inner or head portion of the unit may be formed of one or more looped continuations of the handle wire, or for adjustability relative to the handle, one or more of the retractor unit heads may be formed as blades capable of angular adjustment on the handle. By reason of their open end wire body form, the retractor units are susceptible of easy and thorough sterilization since all surfaces are immediately contactable by a sterilizing fluid.

Another important feature contemplated by the invention is the provision of an improved form of clamp for securing the retractor unit to the frame in a manner permitting its longitudinal adjustment radially of the frame and assuring its positive retention in any adjusted position. Heretofore, clamps or like devices have been used for such attachment of the retractor units to a frame, but in all instances which we have observed, the clamps have lacked comparable capacity for quick and easy operation to positively hold the unit to the frame. Further, they have been so constructed as to interfere with the desired freedom for movement of the surgeons hands within and about the field of surgery, by reason of the extent to which the clamp parts have been permitted to extend above the units and frame. In accordance with the invention, each unit is held to the frame by a simple but highly efficient clamp comprising a pair of parts engageable respectively with the unit handle and frame, the clamp parts being tightened against the frame by a screw having a head desirably large to facilitate manipulation, and positioned to lie closely adjacent the clamp body so as to present minimum interference.

Heretofore, use has been made of retractor units having inner head or blade portions which are adjustable axially of the frame to greater or lesser depths within the abdominal surgical cavity. As in the case of the retracted units not so adjustable, the particular units intended to be adjusted as described at least usually have had an essentially one-piece or rigid construction requiring tilting of the entire unit relative to the frame. The invention contemplates an important advance in that it provides for the mounting of the blade for angular adjustment relative to the handle portion of the unit by a novel and highly efficient clamping device, all in a manner permitting retention and adjustment of the handle portion on the frame by the previously mentioned clamp characterized by its non-interference with the user.

All the various features and advantages of the invention, as well as the details of the illustrative embodiment, will be understood more clearly from the following detailed description of the accompanying drawing, in which:

Fig. 1 is a plan view of the retractor unit and frame assembly;

Fig. 2 is an enlarged fragmentary section taken on line 2—2 of Fig. 1;

Fig. 3 is a cross section on line 3—3 of Fig. 2;

Fig. 4 is an enlarged section on line 4—4 of Fig. 1 but with the blade turned to a lowered position;

Fig. 5 illustrates the outer face of the blade as viewed from line 5—5 of Fig. 4;

Fig. 6 is a cross section on line 6—6 of Fig. 4; and

Fig. 7 is a perspective view illustrating a variational form of the invention.

Referring first to the general showing of Fig. 1, the retractor assembly is shown to comprise an endless frame 10 preferably, though typically, of circular form and made of a metal band the width of which is relatively great as compared with the thickness axially of the frame. As illustrated, the frame carries a circular arrangement of retractor units generally indicated at 11 to 16 each having a handle portion 17 extending across and into the open interior of the frame. Each of the units carries at its inner extremity within the frame a head, generally indicated at 18, the particular shape or formation of which may differ in each instance according to the particular function to be served by the individual units, all as will be understood by those familiar with surgery and this type of equipment.

The handle portion 17 of each of the units 11 to 16 is made of a heavy or substantially rigid wire having an outer terminal loop 19 from which parallel courses 20 of the wire extend inwardly to the head 18. Considering for example the unit 11, the inner ends of the wire extents 20 may be looped at 21 and the ends 20a brought upwardly and between the extents 20 all to be soldered or otherwise joined together, so that the loops 21 form a hand-like angular projection engageable with certain organs to be retracted radially from the center of the frame. In the retractor units 12, 14 and 16, the wire courses 20 terminate any downwardly projecting loop 22, to which is joined a central wire 23 extending upwardly from the loop to a location at 24 between extents 20, where the wires are joined. Unit 15 has a blade form head 25 rigidly fixed to the wires 20. The form and mounting of blade 26 on the inner end of unit 13 will be later described.

Each of the units is releasably held for adjustment radially of the frame by a clamp device generally indicated at 27, the details of which are best illustrated in Figs. 2 and 3. Each clamp comprises an upper section 29, U-shaped in cross section to saddle the wires 20 and having a pair of depending extensions 30 to which is pivoted by pin 31 the lower clamp section 32. As Fig. 2 shows, this section is notched at 33 to receive and engage against the under surface of the frame 10. Sections 29 and 32 are releasably held in tight clamping engagement respectively with the wires 20 and the under surface of the frame 10 by a screw 34 threaded at 35 within the lower section and having an enlarged flat head 129 positioned in close proximity to the upper section for the previously stated purpose of presenting minimum interference within the working field above the retractor assembly. As will be understood, when the clamp is tightened, the top and bottom surfaces of the wires 20 are brought tightly and immovably against clamp section 29 and the frame 10. The clamp being radially fixed by reception of the frame within notch 33, the retractor unit is firmly held in a position to which it may be adjusted.

Referring now to the construction and mounting of blade 26 on unit 13, as particularly illustrated in Figs. 4 to 6, the blade is shown to contain a pair of openings 36 of sufficient size to receive the headed terminals 37 of a U-shaped bracket 38. For securement of the blade to the bracket, the latter is moved into the reduced size extensions 36a of the blade openings and the blade is tightly clamped between the heads 37 and nuts 39 which are tightened against the blade. The bracket 38 carries an enlargement 40 having a segmental spherical surface 41 engaged by clamp strap 42, the inner face of which is recessed as shown in Fig. 6 to provide gripping edges 41a. The lower extent of the strap is attached at 43 to the handle wires 20, while the free end 44 of the strap is apertured to receive a screw 45 the lower end of which is anchored at 46 in the lower extent of the strap. Screw 45 carries a nut 47 which may be adjusted to releasably hold the bracket enlargement 40, and therefore blade 26, in any desired position of angular adjustment. As will appear from the foregoing, by virtue of the described clamp assembly at 48, angular adjustment of blade 26 may be effected independently of movement of the handle 17, and similarly, clamp 27 is adjustable to vary the radial position of the unit independently of the angular position of its blade 26.

In Fig. 7 we show a variational form of the invention directed particularly to a ribbon type retractor, i. e. one in which the primary functional element is of flexible ribbon-like form. Here the retractor, generally indicated at 50, has a handle portion 51 similar to the handle 20 in Fig. 1, to which it attached a pivotally adjustable head assembly 52 secured to the handle by a clamp 53 similar to the form of clamp shown in Fig. 4, except that in Fig. 7 the clamp is inverted in relation to the retractor frame, bringing the tightening screw 54 beneath the frame. The head 52 comprises a U-shaped support 55 having a transverse central enlargement 56 releasably held by the clamp strap 57, in the manner previously described with reference to the corresponding parts 40 and 42 in Fig. 4. The terminals of support 55 are interconnected by a piece 58 and carry a second movable clamp piece 59 adjustable in relation to piece 58 by nuts 60 threaded on the arms of the support. Pieces 58 and 59 receive between them a retractor element 61 in the form of a metallic ribbon having such flexibility as to be deformable by the surgeon in conformance with conditions in the operating area.

The clamp parts 58 and 59 may be spread apart sufficiently to allow the insertion of a ribbon retractor 61 even though the latter may have kinks or waves in it from previous bendings. The working length of the ribbon blade is readily variable by reason of the adjustability of the clamp, so that the blade may be inserted within the operating area to whatever depth desired by the surgeon, and the top end or surplus of the blade may be bent back over the clamp 53 out of the way. Also, with clamp 53 and the nut 54 inverted, the surgeon may make adjustments of the retractor position relative to the frame, without interference with the upper free end of the ribbon blade.

From the foregoing, it will be understood that the various individual kinds and forms of retractors shown and described may readily be adjusted individually, as well as relative to one nut to best suit the operating conditions. In this connection, it is to be particularly noted that by reason of their adjustability on and about the frame, individual instruments may be given whatever grouping desired, with each being positionable radially of the frame to meet any particular condition.

We claim:

1. Surgical retractor apparatus of the character described, comprising an endless open center frame member of polygonal cross-section, a retractor formed of substantially rigid wire doubled spacedly upon itself to form a handle portion extending across and from the outside to the inside of the top surface of said frame, a pair of clamp parts engageable respectively against the top surface of both wire extents of said handle portion and the bottom and side surfaces of the frame member to rigidly hold the retractor against turning laterally of the frame member, and a screw extending between the wire extents of the handle portion and operable to tighten said clamp parts unyieldingly against the handle and frame.

2. Surgical retractor apparatus of the character described, comprising an endless open center frame, a retractor formed of substantially rigid wire doubled spacedly upon itself to form a handle portion extending across and from the outside to the inside of the top surface of said frame, a pair of clamp parts engageable respectively against the top surface of said handle portion and the bottom and side surfaces of the frame, means pivotally interconnecting said parts, and a screw extending between the wire extents of the handle portion and operable to tighten said clamp parts unyieldingly against the handle and frame.

3. Surgical retractor apparatus of the character described, comprising an endless open center frame of polygonal cross-section, a retractor extending across and from the outside to the inside of said frame, and a clamp adjustably securing said retractor to the frame, said clamp comprising a pair of pivotally connected parts of U-shaped cross-section engageable respectively against the top and side surfaces of the retractor and against the bottom and side surfaces of the frame, and a take-up screw engaging said parts.

4. Surgical retractor apparatus of the character described, comprising an endless open center frame formed essentially of a single annular member having rectangular cross-section, a retractor extending across and from the outside to the inside of said frame, and a clamp adjustably securing said retractor to the frame, said clamp comprising a pair of pivotally connected parts of U-shaped cross-section engageable respectively against the top and side surfaces of the retractor and the under and side surfaces of the frame member, and a take-up screw threaded into said parts at locations between the sides of the retractor and at one side of the frame member and having an enlarged head positioned closely adjacent one of the sections so as to minimize interference with hand movements of the user.

5. Surgical retractor apparatus of the character described, comprising a single circular frame bar having a relatively wide radial dimension, a retractor extending across and from the outside to the inside of said frame, and a clamp adjustably securing said retractor to the frame, said clamp comprising a pair of sections engageable respectively against the top surface of the retractor and the bottom and side surfaces of the frame, means pivotally interconnecting the sections at one side of the frame bar, and a take-up screw engaging said sections at the opposite sides of the frame bar and having an enlarged head positioned closely adjacent one of the sections so as to minimize interference with hand movements of the user.

6. Surgical retractor apparatus of the character described comprising a circular single frame bar having a relatively wide radial dimension, a retractor extending across and from the outside to the inside of said frame, and a clamp adjustably securing said retractor to the frame, said clamp comprising a pair of U-shaped sections engageable respectively against the top and side surfaces of the retractor and against the bottom surface of the frame, means pivotally interconnecting said sections at one side of the frame bar, one of said sections at the opposite side of the frame bar being notched to receive the frame bar, and a take-up screw engaging said sections and having an enlarged head positioned closely adjacent one of the sections so as to minimize interference with hand movements of the user.

7. Surgical retractor apparatus of the character described, comprising an endless open center frame, a longitudinally adjustable retractor having a handle portion extending across and from the outside to the inside of the frame, means releasably fixing said handle portion to the frame, said retractor including a head portion extending axially of the frame relative to the handle portion, a U-shaped member attached to said head portion and mounting it for swinging movement in the plane of the handle toward or away from the center of the frame, and a clamp releasably engaging said member to hold said head portion at any of different angles relative to the handle portion.

8. Surgical retractor apparatus of the character described, comprising an endless open center frame, a longitudinally adjustable retractor having a handle portion extending across and from the outside to the inside of the frame, means releasably fixing said handle portion to the frame, said retractor including a head portion extending axially of the frame relative to the handle portion, a U-shaped member attached to said head portion and having intermediate its ends an enlargement, a clamp strap extending about said enlargement and attached to the handle portion and mounting it for swinging movement in the plane of the handle toward or away from the center of the frame, and a screw adjustable to releasably clamp said enlargement in any of different angular positions relative to the handle portion.

9. Surgical retractor apparatus of the character described, comprising an endless open center frame, a longitudinally adjustable retractor having a handle portion extending across and from the outside to the inside of the frame, a clamp releasably fixing said handle portion to the frame, said retractor including a head portion extending axially of the frame relative to the handle portion, a pivotal joint interconnecting said head and handle portions for swinging movement of the free end of the head in line with the handle portion and toward or away from the center of the frame, said pivoted joint being formed by a terminal extent of said handle portion doubled about and receiving said head portion, and a screw interconnecting said extents of the handle portion to releasably clamp said head portion at any of different angles relative to the handle portion.

10. Surgical retractor apparatus of the character described, comprising an endless open center frame, a longitudinally adjustable retractor having a handle portion extending across and from the outside to the inside of the frame, means releasably fixing said handle portion to the frame, said retractor including a head portion extending axially of the frame relative to the handle portion and having a segmental spherical surface, said handle portion including a clamp strap engaging and extending about said segmental spherical surface to hold the head portion at any of different angular positions relative to the handle portion, and a screw releasably holding said strap in clamping engagement with said surface.

11. Surgical retractor apparatus comprising a longitudinally adjustable retractor having a handle portion adapted to extend across and from the outside to the inside of an endless open center frame, a clamp releasably holding the retractor to the frame, said retractor including an adjustable head, a second clamp attaching the head to the handle portion for vertical swinging movement relative thereto, a third clamp carried by the head, and a flexible ribbon retractor member releasably held by the third clamp and deflectible in the place of the handle toward or away from the center of the frame by loosening the second clamp.

12. Surgical retractor apparatus comprising a longitudinally adjustable retractor having a handle portion adapted to extend across and from the outside to the inside of an endless open center frame, a clamp releasably holding the retractor to the frame, said retractor including an adjustable head, a second clamp attaching the head to the handle portion for vertical swinging movement relative thereto, and a third clamp carried by the head and comprising a U-shaped support, a pair of spaced relatively movable clamping elements carried by said support, a flexible ribbon retractor member received between said elements, and nuts carried by said support and adjustable to move one of said elements into clamping engagements with said member, said retractor member being deflectible in the plane of the handle toward or away from the center of the frame by loosening the second clamp.

ISRAEL OWEN BARLOW.
CHESTER FORREST MASON.

REFERENCES CITED

The following references are of record in the file of this patent:

UNITED STATES PATENTS

| Number | Name | Date |
|---|---|---|
| 151,228 | Knaffl | May 26, 1874 |
| 497,064 | Van Meter | May 9, 1893 |
| 1,839,726 | Arnold | Jan. 5, 1932 |
| 1,963,173 | Morin | Jan. 19, 1934 |
| 2,053,868 | Grosso | Sept. 8, 1936 |
| 2,541,516 | Ivory | Feb. 13, 1951 |

FOREIGN PATENTS

| Number | Country | Date |
|---|---|---|
| 116,312 | Great Britain | June 2, 1918 |

OTHER REFERENCES

1912–13 Catalog of the KNY-Scherer Co. of New York, N. Y., p. 5111. (Copy in Division 55.)